(12) United States Patent
Zhou et al.

(10) Patent No.: US 11,643,482 B2
(45) Date of Patent: May 9, 2023

(54) POSS MODIFIED POLYACRYLATE FLUORIDE-FREE WATERPROOF AGENT AND PREPARATION METHOD THEREOF

(71) Applicants: Jianhua Zhou, Xi'an (CN); Lin Wang, Xi'an (CN); Yan Li, Xi'an (CN); Xiaoyu Chen, Xi'an (CN)

(72) Inventors: Jianhua Zhou, Xi'an (CN); Lin Wang, Xi'an (CN); Yan Li, Xi'an (CN); Xiaoyu Chen, Xi'an (CN)

(73) Assignee: SHAANXI UNIVERSITY OF SCIENCE AND TECHNOLOGY, Xi'an (CN)

( * ) Notice: Subject to any disclaimer, the term of this patent is extended or adjusted under 35 U.S.C. 154(b) by 205 days.

(21) Appl. No.: 17/196,004

(22) Filed: Mar. 9, 2021

(65) Prior Publication Data

US 2021/0324116 A1    Oct. 21, 2021

(30) Foreign Application Priority Data

Apr. 21, 2020   (CN) .......................... 202010318064.1

(51) Int. Cl.
| | | |
|---|---|---|
| *C08F 20/18* | (2006.01) | |
| *C08F 2/28* | (2006.01) | |
| *C08F 2/44* | (2006.01) | |
| *C08G 77/04* | (2006.01) | |
| *C08K 5/29* | (2006.01) | |

(52) U.S. Cl.
CPC ................ *C08F 20/18* (2013.01); *C08F 2/28* (2013.01); *C08F 2/44* (2013.01); *C08G 77/045* (2013.01); *C08K 5/29* (2013.01)

(58) Field of Classification Search
CPC .... C08F 20/18; C08F 2/28; C08F 2/44; C08F 4/04; C08F 220/18; C08F 220/14; C08G 77/045; C08G 77/20; C08G 77/442; C08K 5/29; C09D 143/04; C09D 183/10; D06M 15/3568; D06M 2101/06; D06M 2200/12
See application file for complete search history.

(56) References Cited

U.S. PATENT DOCUMENTS

2011/0220833 A1*   9/2011   Yamamoto ........ D06M 15/6436
                                                252/8.62

FOREIGN PATENT DOCUMENTS

| CN | 109438637 A | 3/2019 |
|---|---|---|
| CN | 110317307   | * 10/2019 |

* cited by examiner

*Primary Examiner* — Robert S Jones, Jr.
*Assistant Examiner* — Jiangtian Xu

(57) ABSTRACT

A POSS modified polyacrylate fluorine-free waterproofing agent includes following components: 1-10 wt % of a functionalized POSS monomer, 2-20 wt % of methyl methacrylate, 3-26 wt % of butyl acrylate, 1-10 wt % of a long-chain acrylate monomer, 0.5-3.5 wt % of an initiator, 0.5-4 wt % of a reactive cationic emulsifier, and 50-80 wt % of deionized water. A method of preparing a POSS modified polyacrylate fluorine-free waterproofing agent is also disclosed.

4 Claims, No Drawings

POSS MODIFIED POLYACRYLATE FLUORIDE-FREE WATERPROOF AGENT AND PREPARATION METHOD THEREOF

The present invention claims priority to Chinese Application Number CN 202010318064.1, filed on Apr. 21, 2020, which is incorporated by reference for all purposes as if fully set forth herein.

FIELD OF THE INVENTION

The invention relates to the technical field of textile auxiliaries, and specifically relates to a POSS modified polyacrylate fluorine-free waterproofing agent, a method of preparing the POSS modified polyacrylate fluorine-free waterproofing agent.

BACKGROUND OF THE INVENTION

Long-chain alkyl-containing acrylate polymers combine the low surface energy of long-chain alkyl groups and the excellent film-forming properties, weather resistance, color retention, transparency, and flexibility of acrylate polymers, and can be applied to the waterproof finishing of fabrics to give the fabrics a certain degree of waterproof performance. It is one of the environmentally friendly non-fluorine waterproofing agents being currently studied. The cationic fluorine-containing acrylate polymer is a positively charged polymer, and can be chemically bonded with the negative charge on the surface of a material, which not only improves the surface properties of the material, but also binds more closely to textiles, leather, paper, etc. However, simply using the hydrophobic effect of the long-chain alkyl group is insufficient to reduce the surface energy, and the waterproof effect is still far behind the fluorine-containing waterproof agent.

In order to obtain more excellent water resistance, in recent years, researchers have turned their attention to using nanoparticles to construct a rough structure on the surface of the fabric to improve the waterproof performance of the fabric. Polyhedral oligomeric silsesquioxane (Polyhedral Oligomeric Silsesquioxane, or POSS) as a new nano-hybrid material has received extensive attention from the scientific community. POSS is a three-dimensional structure, organic-inorganic hybrid nano-molecule, consisting of a cage-like core connected by silicon-oxygen bonds and a shell of organic functional groups connected to silicon atoms. POSS molecules can be attached to the arms of the cage structure with organic group substituents to be reactive and compatible with most copolymers. In addition, the single-nanometer-scale structure of the POSS molecule makes its aggregation size also nano-level. If it is combined with a preparation method that can construct a special rough structure, the hydrophobicity of the surface can be improved.

Soap-free emulsion polymerization refers to an emulsion polymerization process in which no emulsifier is added or only a small amount of emulsifier (less than the critical micelle concentration CMC) is added during the reaction. The functionalized POSS is used as a reactive monomer, and a cationic reactive emulsifier is used to prepare the cationic POSS modified polyacrylate fluorine-free waterproofing agent through a soap-free emulsion polymerization. The synthesis conditions are simple. The reaction route is short, and it is used in waterproof and moisture-proof coatings. The field has a wide range of application prospects, but there are no related reports about POSS modified polyacrylate fluorine-free waterproofing agent and cationic POSS modified polyacrylate fluorine-free waterproofing agent prepared by a soap-free emulsion polymerization technology.

SUMMARY OF THE INVENTION

The present application provides a POSS modified polyacrylate fluorine-free waterproofing agent comprising following components: 1-10 wt % of a functionalized POSS monomer, 2-20 wt % of methyl methacrylate, 3-26 wt % of butyl acrylate, 1-10 wt % of a long-chain acrylate monomer, 0.5-3.5 wt % of an initiator, 0.5-4 wt % of a reactive cationic emulsifier, and 50-80 wt % of deionized water.

In another embodiment, the functionalized POSS monomer has the following structure:

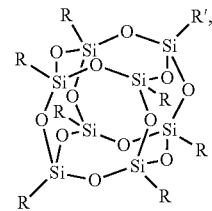

R is propyl, isobutyl, or octyl, and R' is vinyl, methacryloxypropyl, or a methacrylate group.

In another embodiment, the long-chain acrylate monomer is lauryl acrylate, hexadecyl acrylate, stearyl acrylate, or a mixture thereof.

In another embodiment, the initiator is 2,2'-azobis(2-methylpropionamidine) dihydrochloride or azobisisopropylamidine hydrochloride.

In another embodiment, the reactive cationic emulsifier is methacryloxyethyl dimethyl cetyl ammonium bromide, methyl acryloyloxyethyl dimethyl dodecyl ammonium bromide, or methacryloyloxyethyl dimethyl decyl ammonium bromide.

In another embodiment, the reactive cationic emulsifier is methacryloxyethyl dimethyl cetyl ammonium bromide, methyl acryloyloxyethyl dimethyl dodecyl ammonium bromide, or methacryloyloxyethyl dimethyl decyl ammonium bromide. In another embodiment, the present application provides a method of preparing a POSS modified polyacrylate fluorine-free waterproofing agent consisting of the following steps: (1) mixing a functionalized POSS monomer, methyl methacrylate, butyl acrylate, a long-chain acrylate, methyl acryloyloxyethyl dimethyl dodecyl ammonium bromide, and deionized water in a weight ratio of 1.2:23:34:1.8:2.0:140 to obtain a pre-emulsion, the functionalized POSS monomer having the following formula: $(SiO_{1.5})_8R_7(CH_2)_3OOCC(CH_3)CH_2$, $R = -C_8H_{17}$; (2) mixing 30% of the pre-emulsion obtained in step (1) with a methyl acryloyloxyethyl dimethyl dodecyl ammonium bromide aqueous solution in a reactor, the methyl acryloyloxyethyl dimethyl dodecyl ammonium bromide aqueous solution including methyl acryloyloxyethyl dimethyl dodecyl ammonium bromide and deionized water in a weight ratio of 1:60; stirring at 50° C. and a speed of 250 r/min; (3) preparing a 2,2'-azobis(2-methylpropionamidine) aqueous solution that includes 2,2'-azobis(2-methylpropionamidine) and deionized water in a weight ratio of 1:9; adding 35% of the 2,2'-azobis(2-methylpropionamidine) aqueous solution to the reactor and stirring for 20 minutes; (4) adding remaining 70% of the pre-emulsion obtained in step (1) and remaining 65% of the 2,2'-azobis(2-methylpropionamidine) aqueous solution to reactor in 90 minutes at 70° C., and stirring at 70° C. for 120 minutes; and (5) lowering to room temperature to obtain the POSS modified polyacrylate fluorine-free waterproofing agent as an emulsion.

In another embodiment, the present application provides a method of preparing a POSS modified polyacrylate fluorine-free waterproofing agent that includes the following steps: (1) weighing the following raw materials according to mass percentage: a functionalized POSS monomer 1-10%, methyl methacrylate 2-20%, butyl acrylate 3-26%, a long-chain acrylic monomer 1-10%, an initiator 0.5-3.5%, a reactive cationic emulsifier 0.5-4%, deionized water 50-80%, the sum of the above components being 100%; (2) mixing 40-80% of the reactive cationic emulsifier weighed in step 1 and all of the functionalized POSS monomer, methyl methacrylate, butyl acrylate, and the long-chain acrylate weighed in step (1), and deionized water to obtain a pre-emulsion mixture; and then emulsifying the pre-emulsion mixture by high-speed stirring to prepare a pre-emulsion; (3) mixing remaining 20-60% of the reactive cationic emulsifier weighed in step 1 with an appropriate amount of deionized water to prepare a reactive cationic emulsifier aqueous solution; mixing the initiator weighed in step 1 with an appropriate amount of deionized water to prepare an initiator aqueous solution; mixing 20%-50% of the pre-emulsion prepared in step (2), 20%-50% of the initiator aqueous solution and the reactive cationic emulsifier aqueous solution, into a reactor equipped with an agitator and a condenser to obtain a reaction mixture; and stirring the reaction mixture at 40° C.-70° C. for 20 min-40 min; (4) adding remaining 50%-80% of the pre-emulsion and remaining 50%-80% of the initiator aqueous solution simultaneously into the reaction mixture at 65-90° C. in 60-180 min; stirring the reaction mixture at 65-90° C. for 90-180 min; and lowering the temperature of the reaction mixture to room temperature to obtain the POSS modified polyacrylate fluorine-free waterproofing agent as an emulsion.

In another embodiment, the pre-emulsion mixture is stirred at 300-700 r/min to obtain the pre-emulsion.

In another embodiment, a mass ratio of the reactive cationic emulsifier and deionized water in the reactive cationic emulsifier aqueous solution in step (3) is 1:35.5-110.

In another embodiment, a mass ratio of the initiator to deionized water in the initiator aqueous solution in step (3) is 1:8-12.

The beneficial effects of the present invention are:

(1) In the present invention, functionalized POSS containing reactive functional groups and hydrophobic R groups are used to modify polyacrylate soap-free emulsion, and the obtained fluorine-free waterproofing agent has strong waterproof performance. Under hydrophobic applications, long-chain acrylates are used. Monomers and hydrophobic R groups in POSS molecules can enhance the hydrophobic properties of the material. Due to the nanostructure of POSS, it can increase the surface roughness and further improve the hydrophobic properties of the polymer.

(2) The invention provides an environmentally friendly soap-free emulsion polymerization method. Water is used as a dispersion medium. The method does not pollute the environment, has simple synthesis conditions, short reaction routes, and high production efficiency, and is suitable for large-scale production.

It is to be understood that both the foregoing general description and the following detailed description are exemplary and explanatory and are intended to provide further explanation of the invention as claimed.

DETAILED DESCRIPTION OF THE ILLUSTRATED EMBODIMENTS

The present invention will be further described below in conjunction with embodiments.

The POSS modified polyacrylate fluorine-free waterproofing agent of the present invention includes the following components according to mass percentage: 1-10% of a functionalized POSS monomer, 2-20% of methyl methacrylate, 3-26% of acrylic butyl ester, 1-10% of a long-chain acrylate monomer, 0.5-3.5% of an initiator, 0.5-4% of a reactive cationic emulsifier, 50-80% deionized water. The total of the mass percentage of the above components is 100%.

Specifically, the structural formula of the functionalized POSS monomer is:

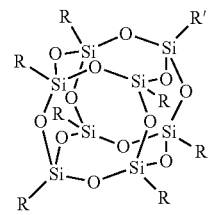

Specifically, in the structure of the functionalized POSS monomer: R is of propyl, isobutyl, or octyl, and R' is vinyl, methacryloxypropyl, or methacrylate.

Specifically, the long-chain acrylate monomer is dodecyl acrylate, hexadecyl acrylate, stearyl acrylate, or a mixture thereof in any ratio.

Specifically, the initiator is 2,2'-azobis(2-methylpropionamidine) dihydrochloride or azobisisopropylamidine hydrochloride.

Specifically, the reactive cationic emulsifier is methacryloxyethyl dimethyl cetyl ammonium bromide, methyl acryloyloxyethyl dimethyl dodecyl ammonium bromide, or methacryloyloxyethyl dimethyl decyl ammonium bromide.

The method of preparing a POSS modified polyacrylate fluorine-free waterproofing agent includes the following steps:

Step (1) weighing the following raw materials according to mass percentage: a functionalized POSS monomer 1-10%, methyl methacrylate 2-20%, butyl acrylate 3-26%, a long-chain acrylic monomer 1-10%, an initiator 0.5-3.5%, a reactive cationic emulsifier 0.5-4%, deionized water 50-80%, the sum of the above components being 100%;

Step (2) mixing 40-80% of the reactive cationic emulsifier weighed in step 1 and all of the functionalized POSS monomer, methyl methacrylate, butyl acrylate, and the long-chain acrylate weighed in step (1), and deionized water to obtain a pre-emulsion mixture; and then emulsifying the pre-emulsion mixture by high-speed stirring to prepare a pre-emulsion;

Step (3) mixing remaining 20-60% of the reactive cationic emulsifier weighed in step 1 with an appropriate amount of deionized water to prepare a reactive cationic emulsifier aqueous solution; mixing the initiator weighed in step 1 with an appropriate amount of deionized water to prepare an initiator aqueous solution; mixing 20%-50% of the pre-emulsion prepared in step (2), 20%-50% of the initiator aqueous solution and the reactive cationic emulsifier aqueous solution, into a reactor equipped with an agitator and a condenser to obtain a reaction mixture; and stirring the reaction mixture at 40° C.-70° C. for 20 min-40 min;

Step (4) adding remaining 50%-80% of the pre-emulsion and remaining 50%-80% of the initiator aqueous solution simultaneously into the reaction mixture at 65-90° C. in 60-180 min; stirring the reaction mixture at 65-90° C. for 90-180 min; and lowering the temperature of the reaction mixture to room temperature to obtain the POSS modified polyacrylate fluorine-free waterproofing agent as an emulsion.

Preferably, the pre-emulsion mixture is stirred at 300-700 r/m

Preferably, the mass ratio of emulsifier and deionized water in the aqueous solution of reactive cationic emulsifier in step (3) is 1:35.5-110.

Preferably, the mass ratio of the initiator to deionized water in the initiator aqueous solution in step (3) is 1:8-12.

Example 1

Step 1: mixing a certain amount of the functionalized POSS monomer, methyl methacrylate, butyl acrylate, octadecyl acrylate, methacryloxyethyl dimethyl cetyl ammonium bromide and an appropriate amount of deionization water to obtain a mixture, and emulsifying the mixture at a high speed to prepare a pre-emulsion; the functionalized POSS monomer, methyl methacrylate, butyl acrylate, octadecyl acrylate, methacryloxyethyl dimethyl cetyl ammonium bromide, and deionized water having a mass ratio of 0.5:28:38:2.3:1.8:120. The functionalized POSS monomer structure is $(SiO_{1.5})_8R_7(CH_2)_3OOCC(CH_3)CH_2$, $R\!=\!\!-\!C_8H_{17}$;

Step 2: adding 20% of the pre-emulsion prepared in step (1) and a certain amount of a reactive cationic emulsifier (methacryloxyethyl dimethyl cetyl ammonium bromide) aqueous solution into a reactor with a stirrer and a condenser, stirring at 40° C., and controlling the stirring speed to 200 r/min; the mass ratio of reactive cationic emulsifier and deionized water in the emulsifier aqueous solution being 1:50;

Step 3: adding 20% of the initiator aqueous solution to the reactor, stirring and reacting for 20 minutes; the initiator being 2,2'-azobis(2-methylpropionamidine) dihydrochloride; and the mass ratio of initiator to water in the initiator aqueous solution is 1:8;

Step 4: adding the remaining pre-emulsion and initiator dropwise to the reactor at 70° C. at the same time, and controlling the dropwise addition within 60 minutes; after the dropwise addition was completed, keeping the reaction at the same temperature for 90 minutes;

Step 5: after the reaction was over, lowering the reaction temperature to room temperature to obtain a POSS modified polyacrylate soap-free emulsion.

Example 2

Step 1: mixing a certain amount of the functionalized POSS monomer, methyl methacrylate, butyl acrylate, octadecyl acrylate, methacryloxyethyl dimethyl cetyl ammonium bromide and an appropriate amount of deionization water to obtain a mixture, and emulsifying the mixture at a high speed to prepare a pre-emulsion; the functionalized POSS monomer, methyl methacrylate, butyl acrylate, octadecyl acrylate, methacryloxyethyl dimethyl cetyl ammonium bromide, and deionized water having a mass ratio of 1.2:23:34:1.8:2.0:140. The functionalized POSS monomer structure is $(SiO_{1.5})_8R_7(CH_2)_3OOCC(CH_3)CH_2$, $R\!=\!\!-\!C_8H_{17}$;

Step 2: adding 30% of the pre-emulsion prepared in step (1) and a certain amount of a reactive cationic emulsifier (methacryloxyethyl dimethyl cetyl ammonium bromide) aqueous solution into a reactor with a stirrer and a condenser, stirring at 50° C., and controlling the stirring speed to 250 r/min; the mass ratio of reactive cationic emulsifier and deionized water in the emulsifier aqueous solution being 1:60;

Step 3: adding 35% of the initiator aqueous solution to the reactor, stirring and reacting for 20 minutes; the initiator being 2,2'-azobis(2-methylpropionamidine) dihydrochloride; and the mass ratio of initiator to water in the initiator aqueous solution is 1:9;

Step 4: adding the remaining pre-emulsion and initiator dropwise to the reactor at 70° C. at the same time, and controlling the dropwise addition within 90 minutes; after the dropwise addition was completed, keeping the reaction at the same temperature for 120 minutes;

Step 5: after the reaction was over, lowering the reaction temperature to room temperature to obtain a POSS modified polyacrylate soap-free emulsion.

Example 3

Step 1: mixing a certain amount of the functionalized POSS monomer, methyl methacrylate, butyl acrylate, octadecyl acrylate, methacryloxyethyl dimethyl cetyl ammonium bromide and an appropriate amount of deionization water to obtain a mixture, and emulsifying the mixture at a high speed to prepare a pre-emulsion; the functionalized POSS monomer, methyl methacrylate, butyl acrylate, octadecyl acrylate, methacryloxyethyl dimethyl cetyl ammonium bromide, and deionized water having a mass ratio of 2.0:27:27:3.2:4.0:160. The functionalized POSS monomer structure is $(SiO_{1.5})_8R_7(CH_2)_3OOCC(CH_3)CH_2$, $R\!=\!\!-\!CH_2CH(CH_3)CH_3$;

Step 2: adding 40% of the pre-emulsion prepared in step (1) and a certain amount of a reactive cationic emulsifier (methacryloxyethyl dimethyl cetyl ammonium bromide) aqueous solution into a reactor with a stirrer and a condenser, stirring at 60° C., and controlling the stirring speed to 300 r/min; the mass ratio of reactive cationic emulsifier and deionized water in the emulsifier aqueous solution being 1:70;

Step 3: adding 40% of the initiator aqueous solution to the reactor, stirring and reacting for 20 minutes; the initiator being 2,2'-azobis(2-methylpropionamidine) dihydrochloride; and the mass ratio of initiator to water in the initiator aqueous solution is 1:10;

Step 4: adding the remaining pre-emulsion and initiator dropwise to the reactor at 80° C. at the same time, and controlling the dropwise addition within 120 minutes; after the dropwise addition was completed, keeping the reaction at the same temperature for 150 minutes;

Step 5: after the reaction was over, lowering the reaction temperature to room temperature to obtain a POSS modified polyacrylate soap-free emulsion.

Example 4

Step 1: mixing a certain amount of the functionalized POSS monomer, methyl methacrylate, butyl acrylate, octadecyl acrylate, methacryloxyethyl dimethyl cetyl ammonium bromide and an appropriate amount of deionization water to obtain a mixture, and emulsifying the mixture at a high speed to prepare a pre-emulsion; the functionalized POSS monomer, methyl methacrylate, butyl acrylate, octadecyl acrylate, methacryloxyethyl dimethyl cetyl ammonium bromide, and deionized water having a mass ratio of 2.2:35:23:1.2:2.5:150. The functionalized POSS monomer structure is $(SiO_{1.5})_8R_7(CH_2)_3OOCC(CH_3)CH_2$, $R=\!\!-\!\!C_8H_{17}$;

Step 2: adding 50% of the pre-emulsion prepared in step (1) and a certain amount of a reactive cationic emulsifier (methacryloxyethyl dimethyl cetyl ammonium bromide) aqueous solution into a reactor with a stirrer and a condenser, stirring at 65° C., and controlling the stirring speed to 300 r/min; the mass ratio of reactive cationic emulsifier and deionized water in the emulsifier aqueous solution being 1:80;

Step 3: adding 50 of the initiator aqueous solution to the reactor, stirring and reacting for 20 minutes; the initiator being 2,2'-azobis(2-methylpropionamidine) dihydrochloride; and the mass ratio of initiator to water in the initiator aqueous solution is 1:11;

Step 4: adding the remaining pre-emulsion and initiator dropwise to the reactor at 85° C. at the same time, and controlling the dropwise addition within 120 minutes; after the dropwise addition was completed, keeping the reaction at the same temperature for 150 minutes;

Step 5: after the reaction was over, lowering the reaction temperature to room temperature to obtain a POSS modified polyacrylate soap-free emulsion.

Example 5

Step 1: mixing a certain amount of the functionalized POSS monomer, methyl methacrylate, butyl acrylate, octadecyl acrylate, methacryloxyethyl dimethyl cetyl ammonium bromide and an appropriate amount of deionization water to obtain a mixture, and emulsifying the mixture at a high speed to prepare a pre-emulsion; the functionalized POSS monomer, methyl methacrylate, butyl acrylate, octadecyl acrylate, methacryloxyethyl dimethyl cetyl ammonium bromide, and deionized water having a mass ratio of 1.0:26:43:2.8:2.6:170. The functionalized POSS monomer structure is $(SiO_{1.5})_8R_7(CH_2)_3OOCC(CH_3)CH_2$, $R=\!\!-\!\!CH_2CH(CH_3)CH_3$;

Step 2: adding 30% of the pre-emulsion prepared in step (1) and a certain amount of a reactive cationic emulsifier (methacryloxyethyl dimethyl cetyl ammonium bromide) aqueous solution into a reactor with a stirrer and a condenser, stirring at 70° C., and controlling the stirring speed to 280 r/min; the mass ratio of reactive cationic emulsifier and deionized water in the emulsifier aqueous solution being 1:90;

Step 3: adding 25% of the initiator aqueous solution to the reactor, stirring and reacting for 20 minutes; the initiator being 2,2'-azobis(2-methylpropionamidine) dihydrochloride; and the mass ratio of initiator to water in the initiator aqueous solution is 1:12;

Step 4: adding the remaining pre-emulsion and initiator dropwise to the reactor at 80° C. at the same time, and controlling the dropwise addition within 90 minutes; after the dropwise addition was completed, keeping the reaction at the same temperature for 180 minutes;

Step 5: after the reaction was over, lowering the reaction temperature to room temperature to obtain a POSS modified polyacrylate soap-free emulsion.

Application Example

Water contact angle tests on the waterproof performance of the POSS modified polyacrylate soap-free emulsion obtained in Examples 1 to 5 were conducted. POSS modified polyacrylate soap-free emulsion solutions of Examples 1-5 were prepared as 70 g/L finishing solutions. A fabric was treated in the finishing solutions for waterproof treatment. The treatment process includes: soaking twice and rolling twice (60 g/L, overrun rate 70%)→drying (80° C., 180 s)→drying (160° C., 180 s)→evaluation. The test fabric was pure cotton fabric.

TABLE 1

Test results of water contact angle of finished fabric

| Samples | Water Contact Angle/° |
|---|---|
| Untreated Fabric | 0 |
| Fabric treated with Example 1 Solution | 145.56 |
| Fabric treated with Example 2 Solution | 155.00 |
| Fabric treated with Example 3 Solution | 149.57 |
| Fabric treated with Example 4 Solution | 152.68 |
| Fabric treated with Example 5 Solution | 147.95 |

It can be seen from Table 1 that the water contact angles of the fabric treated with the Examples 1-5 solutions are above 145°, even reaching superhydrophobicity (Example 2), indicating that the POSS modified polyacrylate fluorine-free waterproofing agent provided by the present invention can significantly improve the waterproofness of the cotton fabric. This is achieved by the synergy between the low surface energy provided by the long-chain alkyl group and the hydrophobic R group on the POSS molecule and the nano-scale roughness of the POSS structure to improve the hydrophobicity of the cotton fabric.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A POSS modified polyacrylate fluorine-free waterproofing agent consisting of following components:
   1-10 wt % of a functionalized POSS monomer,
   2-20 wt % of methyl methacrylate,
   3-26 wt % of butyl acrylate,
   1-10 wt % of a long-chain acrylate monomer, wherein the long-chain acrylate monomer is lauryl acrylate, hexadecyl acrylate, stearyl acrylate, or a mixture thereof,
   0.5-3.5 wt % of an initiator,
   0.5-4 wt % of a reactive cationic emulsifier, and
   50-80 wt % of deionized water.

2. The POSS modified polyacrylate fluorine-free waterproofing agent according to claim 1, wherein the functionalized POSS monomer has the following structure:

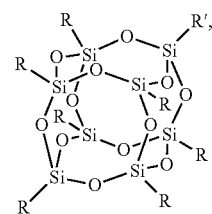

R is propyl, isobutyl, or octyl, and R' is vinyl, methacryloxypropyl, or a methacrylate group.

3. The POSS modified polyacrylate fluorine-free waterproofing agent according to claim 1, wherein the initiator is 2,2'-azobis(2-methylpropionamidine) dihydrochloride or azobisisopropylamidine hydrochloride.

4. The POSS modified polyacrylate fluorine-free waterproofing agent according to claim 1, wherein the reactive cationic emulsifier is methacryloxyethyl dimethyl cetyl ammonium bromide, methyl acryloyloxyethyl dimethyl dodecyl ammonium bromide, or methacryloyloxyethyl dimethyl decyl ammonium bromide.

* * * * *